(12) United States Patent
Hishida

(10) Patent No.: US 11,343,880 B2
(45) Date of Patent: May 24, 2022

(54) FAR-INFRARED RAY RADIATION SHEET, METHOD OF MANUFACTURING FAR-INFRARED RAY RADIATION SHEET, AND METHOD OF RADIATING FAR-INFRARED RAYS

(71) Applicants: MOZU CO., LTD, Tokyo (JP); IWC CO., LTD, Osaka (JP)

(72) Inventor: Kiyoyuki Hishida, Tokyo (JP)

(73) Assignees: MOZU CO., LTD, Tokyo (JP); IWC CO., LTD, Osaka (JP)

( * ) Notice: Subject to any disclaimer, the term of this patent is extended or adjusted under 35 U.S.C. 154(b) by 77 days.

(21) Appl. No.: 16/621,728

(22) PCT Filed: Jun. 11, 2018

(86) PCT No.: PCT/JP2018/022261
§ 371 (c)(1),
(2) Date: Dec. 12, 2019

(87) PCT Pub. No.: WO2018/230511
PCT Pub. Date: Dec. 20, 2018

(65) Prior Publication Data
US 2020/0146114 A1    May 7, 2020

(30) Foreign Application Priority Data
Jun. 13, 2017  (JP) .............................. JP2017-116164

(51) Int. Cl.
*H05B 3/20* (2006.01)
*B32B 5/02* (2006.01)
(Continued)

(52) U.S. Cl.
CPC ................. *H05B 3/20* (2013.01); *B32B 5/02* (2013.01); *B32B 27/12* (2013.01); *B32B 27/36* (2013.01);
(Continued)

(58) Field of Classification Search
CPC ........ H05B 3/28; H05B 5/02; H05B 2203/01; H05B 2203/017; H05B 3/145;
(Continued)

(56) References Cited

FOREIGN PATENT DOCUMENTS

| CN | 105960035 A | 9/2016 |
|---|---|---|
| JP | 3181506 B2 | 7/2001 |

(Continued)

OTHER PUBLICATIONS

Machine translation of CN 105960035 A; Publication date: Sep. 21, 2016.*

(Continued)

*Primary Examiner* — Vishal I Patel
(74) *Attorney, Agent, or Firm* — Aslan Law, P.C.

(57) ABSTRACT

Heat generation efficiency is increased; temperature-keeping performance is increased; heat unevenness is reduced; and a heat diffusion property is increased. Provided is a far-infrared ray radiation sheet 1 according to the present invention that is formed in a planar shape, that radiates far-infrared rays, the far-infrared ray radiation sheet comprising a heat generation type mixed paper 10 comprising a basic material, carbon fiber exhibiting high heat conductivity, first graphite exhibiting high heat conductivity, second graphite that forms a conductive network, and mixed paper formed by mixing the basic material, the carbon fiber, the first graphite and the second graphite; electrodes 21 provided to the heat generation type mixed paper 10; and prepregs 11 laminated on the heat generation type mixed paper 10, wherein the far-infrared rays are radiated by applying current to the electrodes 21.

1 Claim, 6 Drawing Sheets

(51) Int. Cl.
  *B32B 27/12*  (2006.01)
  *B32B 27/36*  (2006.01)
  *H05B 3/03*  (2006.01)
  *H05B 3/14*  (2006.01)

(52) U.S. Cl.
  CPC ............... *H05B 3/03* (2013.01); *H05B 3/145* (2013.01); *B32B 2262/106* (2013.01); *B32B 2307/302* (2013.01); *H05B 2203/01* (2013.01); *H05B 2203/017* (2013.01); *H05B 2203/026* (2013.01)

(58) Field of Classification Search
  CPC ...... H05B 2203/032; H05B 3/03; H05B 3/20; H05B 2203/026; B32B 7/02; B32B 7/025; B32B 27/12; B32B 2307/302; B32B 27/36
  See application file for complete search history.

(56) References Cited

FOREIGN PATENT DOCUMENTS

| JP | 2002-093554 A | 3/2002 |
|---|---|---|
| JP | 2017-069061 A | 4/2017 |

OTHER PUBLICATIONS

EP Search Report issued in EP patent application No. 18 817 503.8, EPO, dated Feb. 12, 2021, 9 pages.

* cited by examiner

# FAR-INFRARED RAY RADIATION SHEET, METHOD OF MANUFACTURING FAR-INFRARED RAY RADIATION SHEET, AND METHOD OF RADIATING FAR-INFRARED RAYS

CROSS-REFERENCE TO RELATED APPLICATIONS

This application claims priority to JP Patent Application No. 2017-116164 filed on Jun. 13, 2017, and to PCT Application No. PCT/JP2018/022261 filed on Jun. 11, 2018, the entire contents of which are hereby incorporated by reference.

TECHNICAL FIELD

The present invention relates to a far-infrared ray radiation sheet that radiates far-infrared rays, a method of manufacturing the far-infrared ray radiation sheet, and a method of radiating the far-infrared rays.

BACKGROUND ART

Sheet-like heat generating elements each in which carbon fiber is used have been conventionally proposed as a heater for heating or air-conditioning. The sheet-like heat generating elements each in which carbon fiber is used have attracted much attention as a heat generating element that radiates far-infrared rays, and are put to practical use as a far-infrared ray radiation sheet. The far-infrared ray radiation sheet is prepared by mixing carbon fiber in chopping shape in pulp or the like; providing electrodes to a sheet prepared by paper-making, using copper foils, silver paste and so forth; and being packed or laminated by insulators such as glass epoxy, PET films and so forth. Such a far-infrared ray radiation sheet exhibiting conductivity is used as a heater material that efficiently radiates far-infrared rays planarly.

For example, a far-infrared ray radiation sheet that more efficiently radiates far-infrared rays in a specific wavelength region is disclosed in the patent document 1. According to the far-infrared ray radiation sheet, carbon fiber is used as no mere heat generating element, but as a far-infrared ray radiation material; electrodes are provided to black-colored carbon fiber mixed paper; and it is so constituted that organic compound layers are laminated on the carbon fiber mixed paper. In addition, the far-infrared rays mean infrared rays having a wavelength in the range between approximately 4 μm and approximately 100 μm.

PRIOR ART DOCUMENT

Patent Document

Patent Document 1: Japanese Patent No. 3181506; the specification

SUMMARY OF THE INVENTION

Problems to be Solved by the Invention

However, according to conventional far-infrared ray radiation sheets, temperature is controlled by using a thermostat provided with thermal fuse, a PTC system, a thermistor, or the like, but an electricity use amount to the total current application time is varied by a ratio of time (ON duration) in a state where the power is turned on to time (OFF duration) in a state where the power is turned off. That is, when the heat generation efficiency is poor, temperature rise time to the setting time becomes long. Further, when temperature-keeping performance of a sheet itself is poor, after reaching the setting temperature, temperature fall time after the power is turned off is hastened, and thus in order to maintain the setting temperature, the power has to be turned on and off in a short period of time. As a result of this, heating time (ON duration) becomes long, thereby increasing the electricity use amount.

Further, according to the conventional far-infrared ray radiation sheet, it is known that there appears temperature unevenness of 10 to 15% within the same sheet. Further, when continuing the state where heat dissipation is shielded at an arbitrary location, "stuffy heat" is generated, thereby resulting in a local temperature rise. Specifically, the far-infrared ray radiation sheet is placed on a floor in a human life space, and thus there is high possibility that "stuffy heat" is generated at the location where furniture or the like is put. Therefore, an effective solution has been desired.

The present invention has been made in view of such a situation, and it is an object to provide a far-infrared ray radiation sheet exhibiting high heat generation efficiency, high temperature-keeping performance, reduced heat unevenness, and a high heat diffusion property; and to provide a method of manufacturing a far-infrared ray radiation sheet and a method of radiating far-infrared rays thereof.

Means to Solve the Problems (1) In order to achieve the above-described object, the present invention has taken steps as follows. That is, it is a feature that a far-infrared ray radiation sheet according to the present invention is a far-infrared ray radiation sheet formed in a planar shape, that radiates far-infrared rays, the far-infrared ray radiation sheet comprising a sheet-like heat generating element comprising a basic material, carbon fiber exhibiting high heat conductivity, first graphite exhibiting high heat conductivity, second graphite that forms a conductive network, and mixed paper formed by mixing the basic material, the carbon fiber, the first graphite and the second graphite; electrodes provided to the sheet-like heat generating element; and organic compound layers laminated on the sheet-like heat generating element, wherein the far-infrared rays are radiated by applying current to the electrodes.

According to this configuration, heat generation efficiency becomes high and temperature-keeping performance becomes high, and thus temperature rise time to the setting temperature is shortened; and after reaching the setting temperature, temperature fall time after power is turned off becomes slow. As a result of this, an electricity use amount can be reduced by shortening the total current application time. Further, according to this configuration, heat conductivity and a heat diffusion property can be enhanced, and thus the local temperature rise generated by continuing the state where heat dissipation is shielded can be suppressed while suppressing two-dimensional temperature unevenness within the same sheet. Consequently, generation of stuffy heat thereof can be reduced.

(2) Further, it is a feature that a far-infrared ray radiation sheet according to the present invention is a far-infrared ray radiation sheet formed in a planar shape, that radiates far-infrared rays, the far-infrared ray radiation sheet comprising a sheet-like heat generating element comprising a basic material, carbon fiber exhibiting high heat conductivity, second graphite that forms a conductive network, and mixed paper formed by mixing the basic material, the carbon fiber and the second graphite; electrodes provided to the sheet-like heat generating element; and organic compound layers laminated on the sheet-like heat generating element, wherein the far-infrared rays are radiated by applying current to the electrodes.

According to this configuration, heat generation efficiency becomes high and temperature-keeping performance becomes high, and thus temperature rise time to the setting temperature is shortened; and after reaching the setting temperature, temperature fall time after power is turned off becomes slow. As a result of this, an electricity use amount can be reduced by shortening the total current application time. Further, according to this configuration, heat conductivity and a heat diffusion property can be enhanced, and thus the local temperature rise generated by continuing the state where heat dissipation is shielded can be suppressed while suppressing two-dimensional temperature unevenness within the same sheet. Consequently, generation of stuffy heat thereof can be reduced.

(3) Further, it is a feature that a method of manufacturing a far-infrared ray radiation sheet according to the present invention is a method of manufacturing a far-infrared ray radiation sheet that radiates far-infrared rays, the method comprising at least the steps of forming mixed paper by mixing a basic material, carbon fiber exhibiting high heat conductivity, and at least a second graphite out of first graphite exhibiting high heat conductivity and the second graphite that forms a conductive network; forming a pair of metal electrodes along two sides of the mixed paper, that are opposed to each other; and packing the mixed paper to which the pair of metal electrodes are formed, from both surfaces with two sheets each made of an organic compound.

According to this configuration, heat generation efficiency becomes high and temperature-keeping performance becomes high, and thus temperature rise time to the setting temperature is shortened. After reaching the setting temperature, temperature fall time after power is turned off becomes slow, and the total current application time is shortened, thereby being able to manufacture a far-infrared ray radiation sheet capable of reducing an electricity use amount. Further, according to the far-infrared ray radiation sheet, heat conductivity and a heat diffusion property can be enhanced, and thus the local temperature rise generated by continuing the state where heat dissipation is shielded can be suppressed while suppressing two-dimensional temperature unevenness within the same sheet. Consequently, generation of stuffy heat thereof can be reduced.

(4) Further, it is a feature that a method of radiating far-infrared rays according to the present invention comprises using the far-infrared ray radiation sheet according to the above-described (1) or (2).

According to this configuration, the temperature rise time to the setting temperature is shortened, and after reaching the setting temperature, the temperature fall time after power is turned off becomes slow. As a result of this, the electricity use amount can be reduced by shortening the total current application time. Further, according to this configuration, the heat conductivity and the heat diffusion property can be enhanced, and thus the local temperature rise generated by continuing the state where heat dissipation is shielded can be suppressed while suppressing the two-dimensional temperature unevenness within the same sheet. Consequently, generation of stuffy heat thereof can be reduced.

Effect of the Invention

According to the present invention, heat generation efficiency becomes high and temperature-keeping performance becomes high, and thus temperature rise time to the setting temperature is shortened; and after reaching the setting temperature, temperature fall time after power is turned off becomes slow. As a result of this, the electricity use amount can be reduced by shortening the total current application time. Further, heat conductivity and a heat diffusion property can be enhanced. As a result of this, the local temperature rise generated by continuing the state where heat dissipation is shielded can be suppressed while suppressing two-dimensional temperature unevenness within the same sheet. Consequently, generation of stuffy heat thereof can be reduced.

DETAILED DESCRIPTION OF EMBODIMENTS

Figure 1:
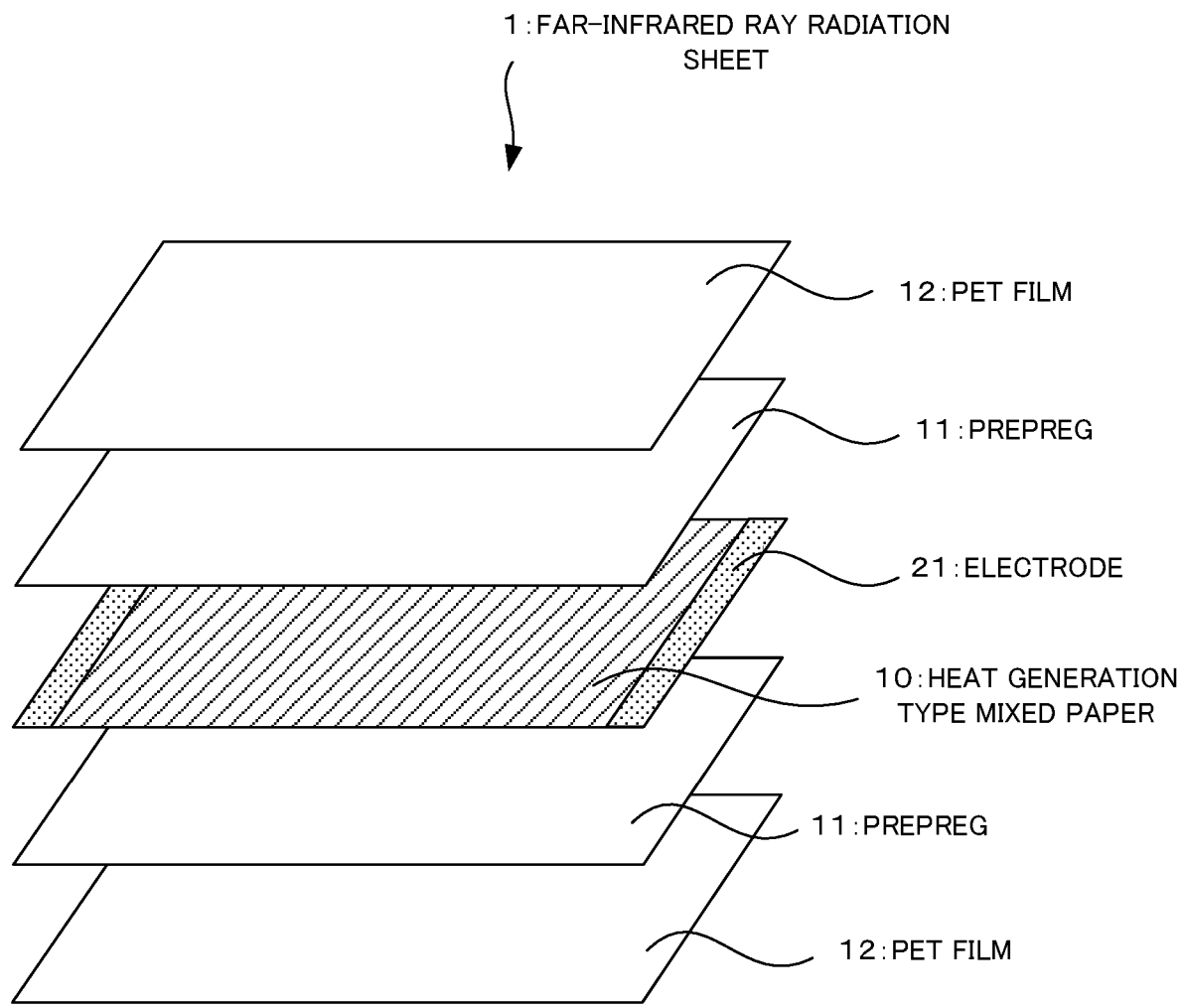
FIG. 1 is an exploded diagram of a far-infrared ray radiation sheet according to the present embodiment.

The present inventor has found out that when heat generation efficiency of a far-infrared radiation sheet is poor, temperature rise time to the setting temperature becomes long; when temperature-keeping performance of a sheet itself is poor, after reaching the setting temperature, temperature fall time after the power is turned off is hastened; and the power has to be turned on and off in a short period of time to maintain the setting temperature, so that high heat generation efficiency, high temperature-keeping performance, reduced heat unevenness, and a high heat diffusion property can be realized by using mixed paper in which natural graphite and carbon fiber exhibiting high heat conductivity are mixed, while paying attention to the fact that heating time (ON duration) becomes long, and thus an electricity use amount is increased; there appears temperature unevenness of 10 to 15% within the same sheet according to a conventional far-infrared ray radiation sheet; and when continuing the state where heat dissipation is shielded at an arbitrary location, "stuffy heat" is generated, thereby resulting in a local temperature rise, and the inventor has reached the present invention.

That is, it is a feature that a far-infrared ray radiation sheet according to the present invention is a far-infrared ray radiation sheet formed in a planar shape, that radiates far-infrared rays, the far-infrared ray radiation sheet comprising a sheet-like heat generating element comprising a basic material, carbon fiber exhibiting high heat conductivity, first graphite exhibiting high heat conductivity, second graphite that forms a conductive network, and mixed paper formed by mixing the basic material, the carbon fiber, the first graphite and the second graphite; electrodes provided to the sheet-like heat generating element; and organic compound layers laminated on the sheet-like heat generating element, wherein the far-infrared rays are radiated by applying current to the electrodes.

Consequently, the present inventor has made it possible to slow the temperature fall time after power is turned off, after reaching the setting temperature, by shortening the temperature rise time to the setting temperature. As a result of this, it has been made to become possible to reduce the electricity use amount by shortening the total current application time. Further, the heat conductivity and the heat diffusion property can be enhanced. As a result of this, the local temperature rise generated by continuing the state where the heat dissipation is shielded can be suppressed while suppressing the two-dimensional temperature unevenness within the same sheet, and thus it has been made to become possible to reduce generation of stuffy heat thereof. Next, embodiments of the present invention will be specifically described referring to the drawings.

FIG. 1 is an exploded diagram of a far-infrared ray radiation sheet according to the present embodiment. In the far-infrared ray radiation sheet 1, electrodes 21 are provided at both end portions of a heat generation type mixed paper 10, and packed by a set of prepregs 11 each having a thickness of 0.1 to 0.2 mm to be made into a glass epoxy plate. In addition, the prepregs each mean a plastic molding material obtained by evenly impregnating a fibrous reinforcing material such as a glass cloth, carbon fiber or the like with a thermosetting resin such as epoxy or the like obtained by mixing an additive such as a curing agent, an adhesion material or the like, followed by heating and drying. According to the present embodiment, a set of prepregs 11 each having a thickness of 0.1 to 0.2 mm are used, but the present invention is not limited thereto, and it is possible to appropriately change the thickness. Further, one may be set to a resin sheet formed from a prepreg or the like, and the other one may be constituted from a PET film or the like.

Further, the heat generation type mixed paper 10 having been made into a glass epoxy plate is further packed from both surfaces by a set of PET (Polyethylene terephthalate) films 12 each having a thickness of 0.1 mm, for insulation and protection thereof. In addition, according to the present embodiment, a set of prepregs 11 each having a thickness of 0.1 to 0.2 mm are used, but the present invention is not limited thereto, and it is possible to appropriately change the thickness.

High strength carbon fiber, pulp or the like is used as a "basic material" for the heat generation type mixed paper 10 according to the present embodiment. Specifically, anisotropic pitch-based carbon fiber is used as "carbon fiber exhibiting high heat conductivity". The carbon fiber whose crystalline structures are different from each other due to differences in raw material is categorized into PAN-based one for which polyacrylonitrile is used as raw material, and pitch-based one for which coal tar pitch or petroleum pitch is used as raw material. In contrast with PAN-based carbon fiber exhibiting "lightness in weight•high strength", pitch-based carbon fiber exhibiting high elastic modulus has a feature of "lightness in weight•high stiffness•high heat conductivity•ultra-low thermal expansion". The pitch-based carbon fiber is categorized into an optically isotropic one and an optically anisotropic one based on crystal states of pitch for spinning, when observed by a polarizing microscope. According to the present embodiment, the anisotropic pitch-based carbon fiber is specifically used. The anisotropic pitch-based carbon fiber is one in which graphite crystals are regularly arranged in the fiber axis direction, thereby having heat conductivity equal to or higher than that of metal.

Further, according to the present embodiment, carbon fiber exhibiting high heat conductivity (pitch-based carbon fiber) is mixed in the basic material, and "first graphite" as natural graphite or artificial graphite is mixed. By doing this, it becomes possible to reduce contact resistance between highly heat-conductive carbon fibers. Herein, used may be the artificial graphite obtained by making the carbon fiber exhibiting high heat conductivity (pitch-based carbon fiber) into milled fiber.

Further, mixed is "second graphite" as a natural graphite specialized for forming a conductive network between elements such as carbon fiber, the first graphite that is the natural graphite or the artificial graphite, and so forth. The conductive network in the entire paper is formed by intrusion of the second graphite between respective elements, thereby improving heat conductivity, and realizing smoother heat transfer. In addition, it appears that the graphite that forms the conductive network is not largely involved in a current application property. The reason is that this graphite hardly varies electrical resistance. Then, electrical involvement thereof is poor to such an extent that the electrical resistance is hardly varied, and thus the graphite itself does not generate heat via current application, and the heat is received from a heat generating element other than itself, thereby performing a function for transferring the heat. That is, this graphite results in acting only on heat conduction. Therefore, it can be said that a function of transmitting only heat is performed in a form independently of heat generation via current application, during the current application.

Then, the basic material, the carbon fiber exhibiting high heat conductivity, the first graphite, and the second graphite are mixed to form a heat generation type mixed paper 10. Herein, according to the heat generation type mixed paper 10, an air layer is present between respective elements formed from carbon fiber or graphite in the paper, and thus it is difficult that high heat conductivity is realized only by the heat generation type mixed paper 10. Since the air layer exhibits a high heat insulating property, heat conductivity is suppressed.

Thus, according to the present embodiment, the heat generation type mixed paper 10 is packed from both surfaces by a set of prepregs 11 each containing an epoxy resin slightly more in quantity than conventional glass epoxy. The air layer in the paper has been eliminated by this. In addition, it is possible to employ a mode in which no first graphite is added. In the case of focusing on cost-effectiveness, it does not affect establishment of the present invention to omit the first graphite.

Next, belt-shaped silver paste or copper paste along facing two sides of the heat generation type mixed paper 10 is printed, and copper foils are attached onto the silver paste or copper paste to form electrodes 21. The heat generation type mixed paper 10 according to the present embodiment contains graphite, thereby exhibiting black. That is, the graphite is mixed in the heat generation type mixed paper 10 according to the present embodiment from the viewpoint of electrical conductivity and heat conductivity, in order to improve the conventional heat generation type mixed paper. Therefore, the heat generation type mixed paper 10 according to the present embodiment exhibits black. As a result of this, the far-infrared absorptivity is enhanced more than that of the conventional heat generation type mixed paper. In addition, at least one mixed paper obtained by providing no electrode to the heat generation type mixed paper 10 may be laminated on the heat generation type mixed paper 10.

[First Verification]

Figure 2:
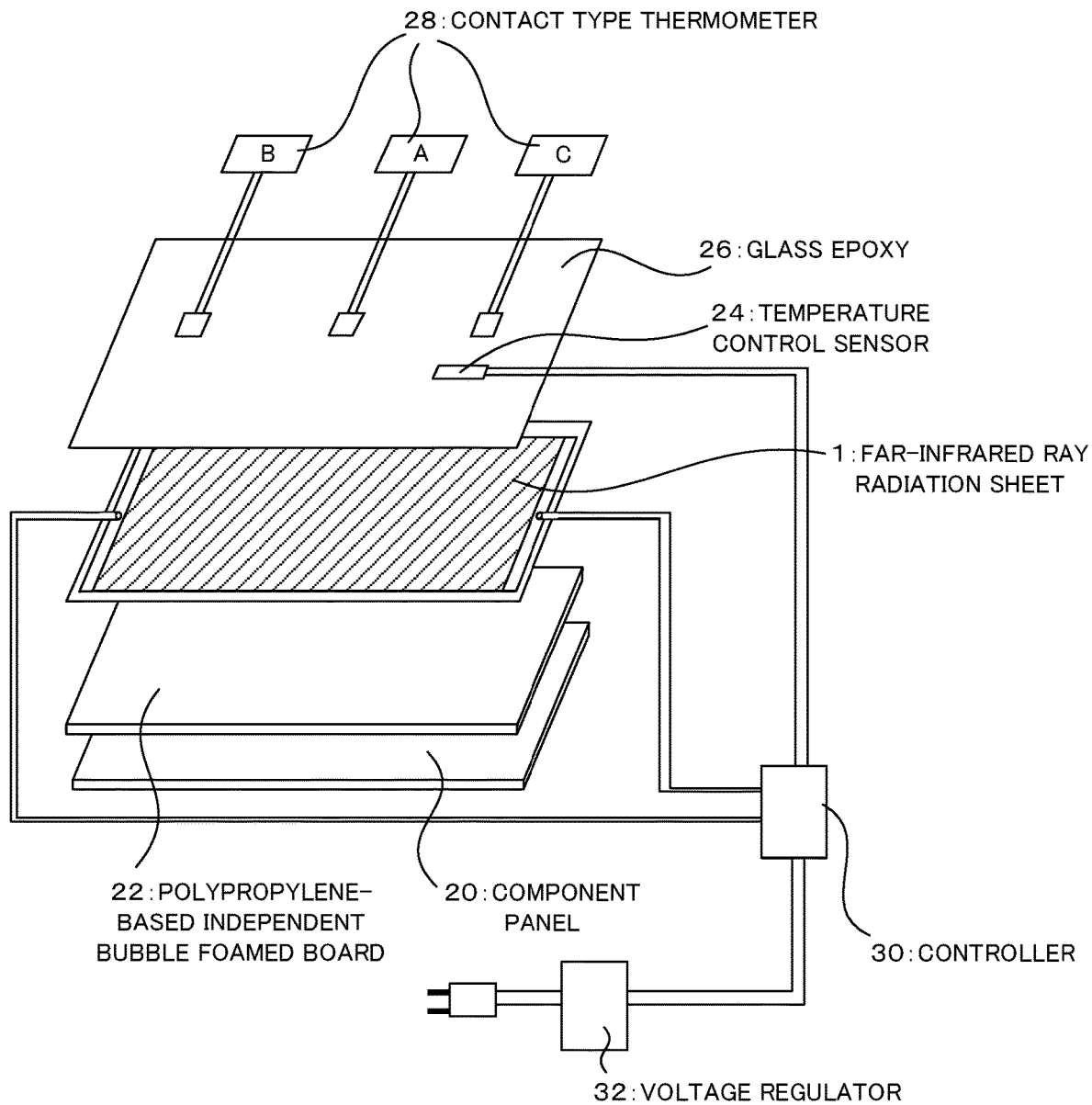
FIG. 2 is an exploded diagram showing a verification outline.
Figure 3:
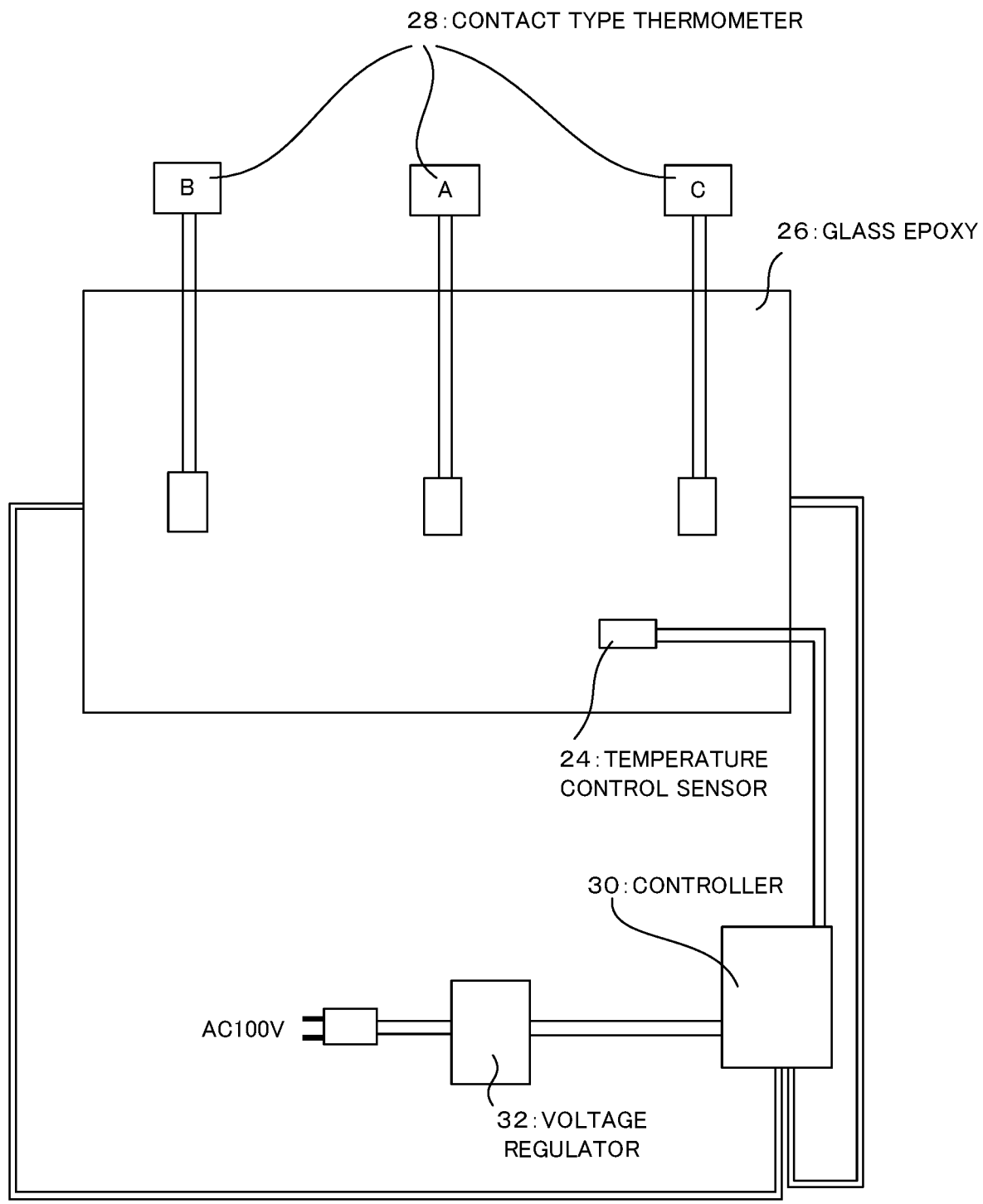
FIG. 3 is a plan view showing a verification outline.

Next, described are results obtained by verifying heat generation efficiency of the far-infrared ray radiation sheet, heat unevenness, and temperature-keeping force according to the present embodiment. FIG. 2 is an exploded diagram showing the verification outline, and FIG. 3 is a plan view showing the verification outline.

[Verification Period]

Feb. 20, 2017-Mar. 31, 2017

[Verification Purpose]

To demonstrate that an improved type far-infrared ray sheet according to the present embodiment (hereinafter, referred to as an "improved type sheet") is superior to a conventional type far-infrared ray radiation sheet (hereinafter, referred to as a "conventional type sheet") in terms of three items of heat generation efficiency, a heat unevenness suppression ratio, and temperature-keeping performance.

[Verification Outline]

A controller and three contact type digital thermometers at respective places are arranged using each of an improved type sheet and a conventional type sheet. Then, it is made clear as numerical values that the improved type sheet more effectively generates heat; suppresses generation of heat unevenness; and exhibits temperature-keeping force superior thereto by measuring "time until reaching the setting temperature", "temperature changes at the three places", "transition of ON duration of current" after starting heating.

[Verification Ambient Conditions]

Room temperature: Outside air temperature within a fixed range (During verification: 16 to approximately 16.5 degrees)

Power: 30 watts (where setting is made so as to be 30 watts, using a voltage regulator)

[Verification Device]

(1) Structure of the device: It is given as shown in FIGS. 1 to 3. That is, a polypropylene-based independent bubble foamed board 22 is layered on a component panel 20, and far-infrared ray radiation sheet 1 according to the present embodiment is layered thereon. A glass epoxy board (glass epoxy 26) is further provided thereon.

(2) Further, as shown in FIG. 2, contact type thermometers 28 are arranged at three places of "A (center)", "B (left end)", and "C (right end)" on the glass epoxy board (glass epoxy 26).

(3) A controller 30 provided with a temperature control sensor 24 is arranged, and control temperature during the verification is set to 50° C. Power supplying to the controller 30 is performed via the voltage regulator 32.

[Verification Procedures]

Figure 4:
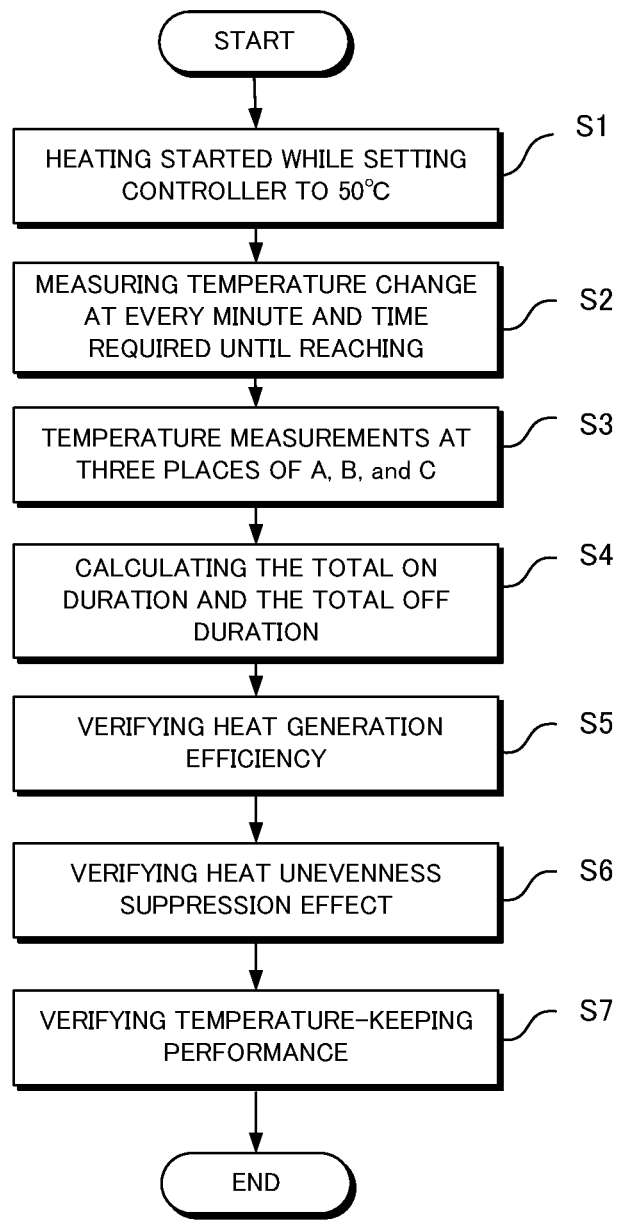
FIG. 4 is a flowchart showing a first verification procedure.

Each of the improved type sheet and the conventional sheet is measured and verified in accordance with the flowchart shown in FIG. 4. In FIG. 4, heating is started while setting the controller 30 provided with the temperature control sensor 24 to 50° C. (step S1). Next, temperature change at every minute until reaching 50° C. (peak temperature), and time required until reaching it are measured with the temperature control sensor 24 (step S2). Temperature measurements at the three places (A, B, and C) at each time point for every restart of ON as well as restart of OFF that is repeated by thermistor control are carried out, after reaching 50° C. (step S3). In addition, the measurement time after reaching 50° C. is set to 120 minutes.

Next, after reaching 50° C., approximately 120 minutes are divided into every 30 minutes, the total ON duration and the total OFF duration for each of them are calculated (step S4). Next, the improved type sheet and the conventional type sheet are compared with each other in terms of the time required in step S2 to verify the heat generation efficiency (step S5). The improved type sheet and the conventional type sheet are compared with each other in terms of temperature measuring results at the time when reaching 50° C. in step S2, and temperature measuring results in step S3 to verify the heat unevenness suppression effect (step S6). Lastly, the improved type sheet and the conventional type sheet are compared with each other in terms of the transition of the total ON duration and the total OFF duration in step S4 to verify the temperature-keeping performance (step S7).

[First Verification Result]

(Result Regarding Heat Generation Efficiency)

The following Table 1 shows the time required until the temperature control sensor 24 with respect to each of the conventional type sheet and the improved type sheet reaches 50° C. (peak temperature).

TABLE 1

| | Required time | |
|---|---|---|
| | Conventional type sheet | Improved type sheet |
| Required time | 9 minutes 30 seconds | 6 minutes 53 seconds |

Thus, the improved type sheet reaches the peak temperature 2 minutes 23 seconds earlier than the conventional type sheet. As a result of this, it has been made clear that the improved type sheet exhibits superior heat generation efficiency thereto.

(Result Regarding Heat Unevenness Suppression Effect)

The following Tables 2 to 4 show that the conventional type sheet and the improved type sheet are compared with each other in terms of an average temperature obtained from three places of "center (A)", "left end (B)", and "right end (C)" in total; and the temperature difference between the highest temperature and the lowest temperature out of (A), (B), and (C) thereto. In addition, in the following Table, the temperature difference between the highest temperature and the lowest temperature with respect to the average temperature is represented as a heat unevenness index. The "heat unevenness index" means one obtained by adding the temperature difference values of the highest temperature and the lowest temperature, respectively, with respective to the average temperature, irrespective of the plus direction as well as the minus direction. It can be determined that the lower the "heat unevenness index", the smaller the heat unevenness is.

TABLE 2

| | Conventional type sheet | | | |
|---|---|---|---|---|
| | Average of 3 places | Highest temperature | Lowest temperature | heat unevenness index |
| Initially at the time of OFF | 51.17° C. | 54.6° C. | 49.1° C. | 5.53 |
| After 30 minutes | 50.87° C. | 53.9° C. | 49.2° C. | 4.70 |
| After 60 minutes | 51.27° C. | 54.1° C. | 49.6° C. | 4.50 |
| After 90 minutes | 51.30° C. | 54.0° C. | 49.5° C. | 4.50 |
| After 120 minutes | 51.57° C. | 54.4° C. | 49.9° C. | 4.50 |

TABLE 3

Improved type sheet

|  | Average of 3 places | Highest temperature | Lowest temperature | heat unevenness index |
|---|---|---|---|---|
| Initially at the time of OFF | 50.53° C. | 51.5° C. | 48.6° C. | 2.90 |
| After 30 minutes | 49.87° C. | 50.3° C. | 49.3° C. | 1.00 |
| After 60 minutes | 50.43° C. | 51.0° C. | 49.8° C. | 1.20 |
| After 90 minutes | 50.67° C. | 51.2° C. | 50.3° C. | 0.90 |
| After 120 minutes | 50.60° C. | 51.3° C. | 50.3° C. | 1.10 |

TABLE 4

Heat unevenness index comparison between the conventional type sheet and the improved type sheet

|  | Conventional type sheet heat unevenness index | Improved type sheet heat unevenness index |
|---|---|---|
| Initially at the time of OFF | 5.53 | 2.90 |
| After 30 minutes | 4.70 | 1.00 |
| After 60 minutes | 4.50 | 1.20 |
| After 90 minutes | 4.50 | 0.90 |
| After 120 minutes | 4.50 | 1.10 |

When comparing heat unevenness indices, the improved type sheet exhibits lower heat unevenness index at any time point than that of the conventional one, and thus it has been made clear that the improved type sheet hardly generates heat unevenness.

(Result Regarding Temperature-Keeping Force)

The following Table 5 shows comparison results for the total ON duration of approximately 120 minutes after the temperature control sensor 24 reaches 50° C. (peak temperature).

TABLE 5

Transition at each 30 minutes

|  | Conventional type sheet | Improved type sheet |
|---|---|---|
| 0 to 30 minutes | 22 minutes | 18 minutes |
| 30 to 60 minutes | 19 minutes | 17 minutes |
| 60 to 90 minutes | 17 minutes | 18 minutes |
| 90 to approximately 120 minutes | 19 minutes | 16 minutes |

The following Tables 6 and 7 show comparison results regarding the total ON duration in approximately 120 minutes, and ratios when approximately 120 minutes are set at 100.

TABLE 6

Conventional type sheet

| Current application time | Total ON duration | Total ON duration ratio |
|---|---|---|
| 0 to 122 minutes | 77 minutes | 63% |

TABLE 7

Improved type sheet

| Current application time | Total ON duration | Total ON duration ratio |
|---|---|---|
| 0 to 123 minutes | 69 minutes | 56% |

In this manner, obtained have been the results showing that the total ON duration ratio of the conventional type sheet is 63%, and in contrast, that of the improved type sheet is 56%. As the temperature-keeping force is more excellent, it becomes possible that temperature is made to fall more slowly from the peak temperature (50° C.). As a result, it has become clear that the improved type sheet is superior to the conventional type sheet in terms of the temperature-keeping force, by judging from a theory that the ON duration is shortened via prolonging of the OFF duration.

Further, the improved type sheet having the lower total ON duration ratio means that the heating time in the total current application time is shorter than that of the conventional type sheet. When this result is applied to the electricity use amount, this indicates that electricity expense is reduced.

[Conclusion of First Verification]

Based on the verification result via the experiments, it can be said that the far-infrared ray radiation sheet according to the present embodiment is a superior sheet-like heater to the conventional type sheet in terms of all of the heat generation efficiency, the heat unevenness suppression ratio, and the temperature-keeping performance. The temperature rise time is hastened, and the temperature fall time is made slow by using the far-infrared ray radiation sheet according to the present embodiment. As a result, it becomes possible that the two-dimensional temperature distribution is uniformized by reducing the temperature unevenness, while enabling shortening of the heating time.

[Second Verification]

Figure 5:
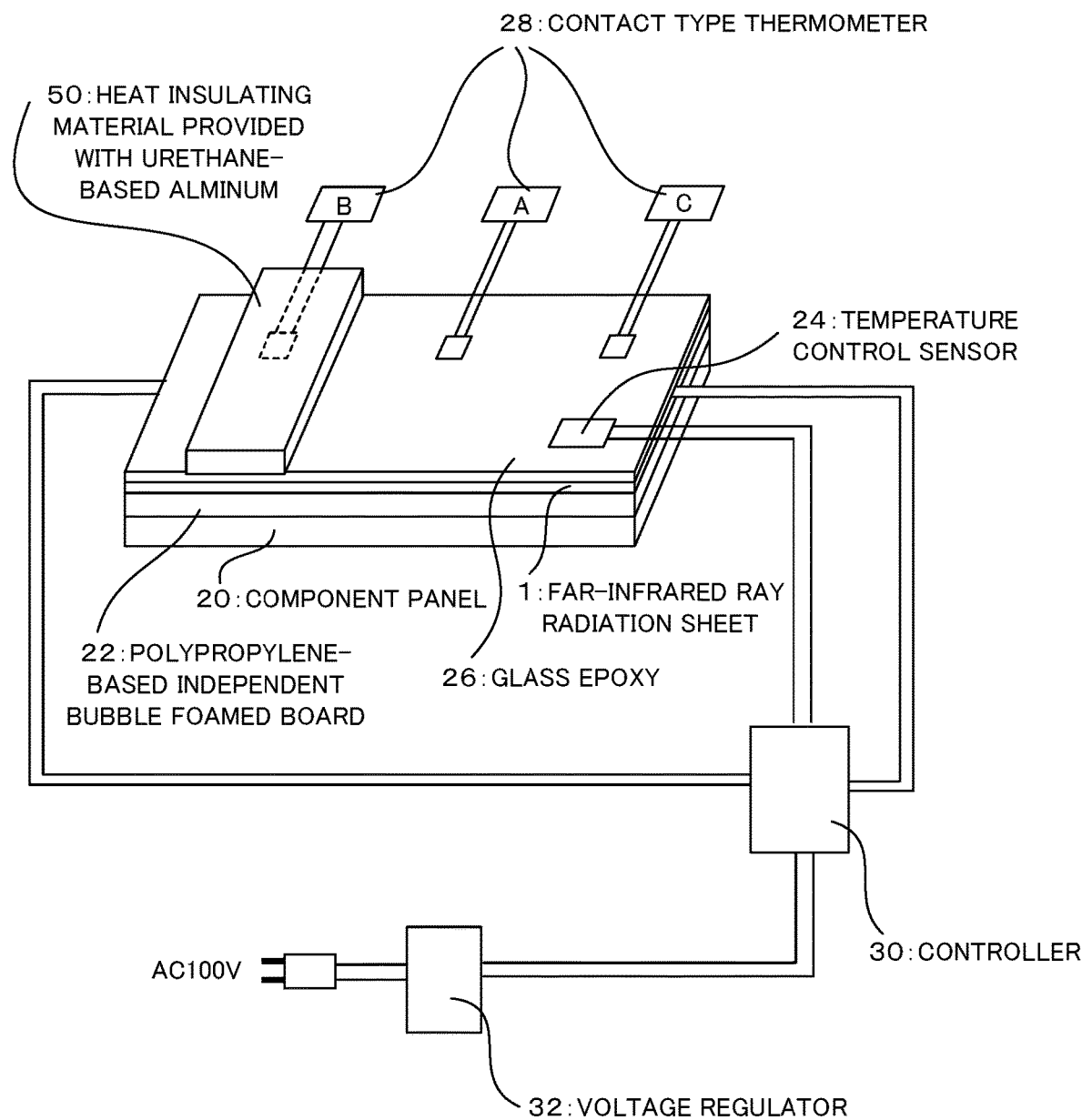
FIG. 5 is a diagram showing a verification outline.

Next, the verification regarding heat diffusion of a far-infrared ray radiation sheet according to the present embodiment will be described. FIG. 5 is a diagram showing the verification outline.

[Verification Period]

Mar. 21-Mar. 31, 2017

[Verification Purpose]

To demonstrate that an improved type far-infrared ray sheet (hereinafter, referred to as an "improved type sheet") is superior to a conventional type far-infrared ray radiation sheet (hereinafter, referred to as a "conventional type sheet") in terms of not only three items of heat generation efficiency, a heat unevenness suppression ratio and temperature-keeping performance, but also heat diffusion.

[Verification Outline]

As shown in FIG. 5, a controller and three contact type digital thermometers at respective places (hereinafter, referred to as "thermometers") are arranged using each of an improved type sheet and a conventional type sheet. It is made clear as numerical values that the improved type sheet more easily diffuses heat by artificially generating abnormal heat generation using a heat insulating material provided with urethane-based aluminum to measure temperature changes of an abnormal heat generation zone and a heat dissipation zone, when reaching the setting temperature after starting heating.

[Verification Ambient Conditions]

Room temperature: Outside air temperature within a fixed range (During verification: 16 to about 17 degrees)

Power: 30 watts (where setting is made so as to be 30 watts, using a voltage regulator)

[Verification Device]

(1) Structure of the device: It is given as shown in FIG. 5. That is, a polypropylene-based independent bubble foamed board 22 is layered on a component panel 20, and far-infrared ray radiation sheet 1 according to the present embodiment is layered thereon. A glass epoxy board (glass epoxy 26) is further provided thereon.

(2) As shown in FIG. 5, contact type thermometers 28 are arranged at three places of "A (heat dissipation zone)", "B (abnormal heat generation zone)", and "C (a place that is 8 cm away from the heat dissipation zone)" on the glass epoxy 26.

(3) A Controller 30 provided with a Temperature control sensor 24 is arranged, and control temperature during the verification is set to 50° C. Power supplying to the controller 30 is performed via the voltage regulator 32.

[Verification Procedures]

Figure 6:
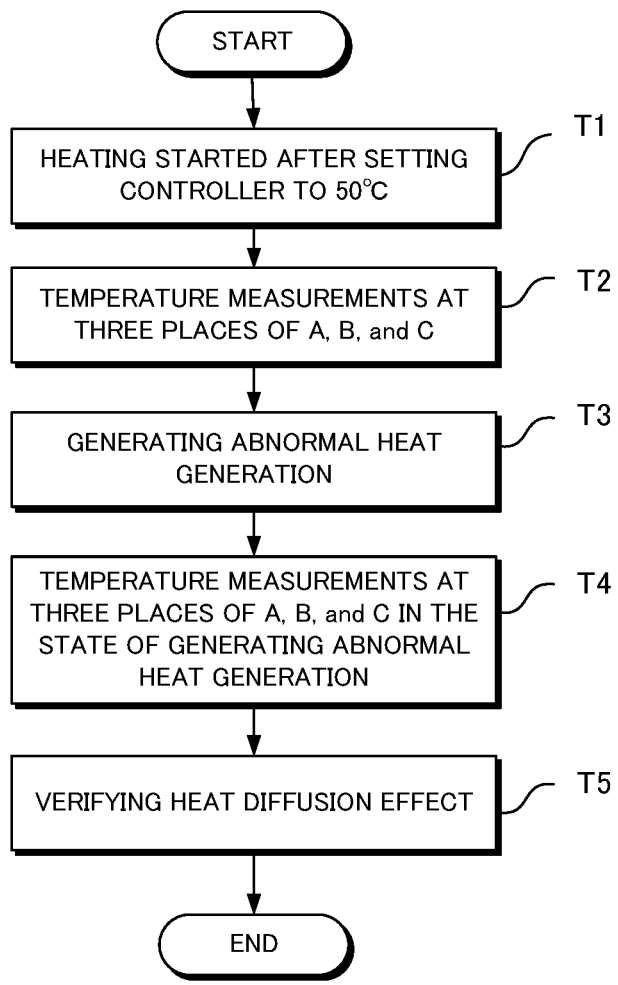
FIG. 6 is a flowchart showing a second verification procedure.

Each of the improved type sheet and the conventional sheet is measured and verified in accordance with the flowchart shown in FIG. 6. In FIG. 6, heating is started after setting the controller 30 provided with the temperature control sensor 24 to 50° C. (step T1). Next, after reaching 50° C., it is confirmed by measuring temperatures at the three places (A, B, and C) where thermometers are arranged that temperature at the time of restart of ON and temperature at the time of restart of OFF each that are repeated by thermistor control are stabilized (step T2).

Next, after confirming temperature stability in step T3, abnormal heat generation is generated by arranging a heat insulating material 50 provided with urethane-based aluminum on a thermometer B (step T3). Then, temperature changes at the three places (A, B, and C) are measured in the state of generating abnormal heat generation (step T4). Herein, the measuring time after generating the abnormal heat generation is set to approximately 120 minutes. Next, at each of the three places where a thermometer is arranged, the heat diffusion effect is verified by finding the numerical value difference between the stable peak temperature in the normal heat generation state and the peak temperature after approximately 120 minutes from the start of abnormal heat generation (step T5).

[Second Verification Result]

The following Tables 8 and 9 each show the difference (rise temperature) between the stable peak temperature in the normal heat generation state and the peak temperature after 120 minutes from the start of abnormal heat generation. Herein, A represents a heat dissipation zone; B represents an abnormal heat generation zone; and C represents a place that is 8 cm away from the heat dissipation zone.

TABLE 8

| Conventional type sheet | | | |
|---|---|---|---|
| | <1> At the time of normal heat generation stable peak | <2> After 120 minutes of abnormal heat generation | Rise temperature (<2> − <1>) |
| Thermometer A | 50.2° C. | 60.6° C. | +10.4° C. |
| Thermometer B | 50.0° C. | 84.0° C. | +34.0° C. |
| Thermometer C | 55.2° C. | 55.5° C. | +0.3° C. |

TABLE 9

| Improved type sheet | | | |
|---|---|---|---|
| | <1> At the time of normal heat generation stable peak | <2> After 120 minutes of abnormal heat generation | Rise temperature (<2> − <1>) |
| Thermometer A | 49.3° C. | 60.4° C. | +11.1° C. |
| Thermometer B | 53.9° C. | 86.1° C. | +32.2° C. |
| Thermometer C | 52.3° C. | 52.9° C. | +0.6° C. |

Table 10 shows "heat diffusion index" obtained by subtracting heat dissipation zone (A) rise temperature from abnormal heat generation zone (B) rise temperature. As the heat diffusion is more increased, the numerical value of the heat diffusion index is made lower.

TABLE 10

| Heat diffusion index | | | |
|---|---|---|---|
| | Rise temperature of thermometer A | Rise temperature of thermometer B | Heat diffusion index |
| Conventional type sheet | +10.4° C. | +34.0° C. | 23.6 |
| Improved type sheet | +11.1° C. | +32.2° C. | 21.1 |

The temperature in a state of generating the abnormal heat generation thermally moves to the heat dissipation zone, but as the difference (heat diffusion index) between the temperature in the state of generating the abnormal heat generation, and the temperature in the heat dissipation zone is lower, heat diffusion performance is eventually made higher. That is, as the heat diffusion performance of a sheet is more improved, the peak temperature in the state of generating the abnormal heat generation exhibits a larger downward tendency, and in contrast, the stable peak temperature in the heat dissipation zone exhibits a larger upward tendency.

When taking the above-described experimental results into consideration, the rise temperature of the thermometer B (temperature in the abnormal heat generation zone) exhibits larger downward tendency of the improved type sheet than that of the conventional type sheet, and in contrast, the rise temperature of the thermometer A (temperature in the heat dissipation zone) exhibits larger upward tendency of the improved type sheet than that of the conventional type sheet. Consequently, when comparing heat diffusion indices, the improved type sheet has a heat diffusion index lower than that of the conventional type sheet, and thus it has been made clear that the improved type sheet more easily diffuses heat.

[Conclusion of Second Verification]

Based on the verification result via the experiments, it can be said that the far-infrared ray radiation sheet according to the present embodiment is a superior sheet-like heater to the conventional type sheet in terms of heat diffusion performance. By using the far-infrared ray radiation sheet according to the present embodiment, it becomes possible that stuffy heat is reduced by effectively performing heat diffusion, even when factors causing the abnormal heat generation occur in a specific place.

In addition, the present international application claims priority under Japanese Patent Application No. 2017-116164, filed Jun. 13, 2017, and the entire content of Japanese Patent Application No. 2017-116164 is applied to the present international application.

EXPLANATION OF THE SYMBOLS

1 Far-infrared ray radiation sheet
10 Heat generation type mixed paper
11 Prepreg
12 PET film
21 Electrode
22 Polypropylene-based independent bubble foamed board
24 Temperature control sensor
26 Glass epoxy
28 Contact type thermometer
30 Controller
32 Voltage regulator

The invention claimed is:

1. A far-infrared ray radiation sheet formed in a planar shape, that radiates far-infrared rays, the far-infrared ray radiation sheet comprising:
   a sheet-like heat generating element comprising of a mixed paper with a basic material, carbon fiber exhibiting high heat conductivity, and graphite that forms a heat-conductive network that transfers heat energy by receiving the heat energy from a heat generating element other than itself without generating heat via current application;
   electrodes provided to the sheet-like heat generating element; and
   organic compound layers laminated on the sheet-like heat generating element, wherein
   the far-infrared rays are radiated by applying current to the electrodes.

* * * * *